United States Patent [19]
Pierce et al.

[11] 3,795,912
[45] Mar. 5, 1974

[54] SPECTRUM ANALYSIS RADAR SYSTEM

[75] Inventors: John N. Pierce, Lexington; F. Sheppard Holt, Winchester, both of Mass.

[73] Assignee: The United States of America as represented by the Secretary of the Air Force, Washington, D.C.

[22] Filed: Jan. 12, 1973

[21] Appl. No.: 323,170

[52] U.S. Cl. ........................................ 343/5 SA
[51] Int. Cl. ............................................ G01s 9/02
[58] Field of Search ............................. 343/5 SA

[56] References Cited
UNITED STATES PATENTS

| | | | |
|---|---|---|---|
| 3,725,917 | 4/1973 | Sletten et al. | 343/5 SA |
| 3,568,189 | 3/1971 | Poirier | 343/5 SA |
| 3,603,990 | 9/1971 | Poirier | 343/5 SA |
| 3,588,895 | 6/1971 | Goggins, Jr. | 343/5 SA |

Primary Examiner—Malcolm F. Hubler

[57] ABSTRACT

A spectrum analysis radar that detects and ranges by processing the sum of the received signal from a target with each of four quadrature phase-shifted reference signals (attenuated and possibly time delayed samples of the transmitted signal). These four sum signals are power spectrum density analyzed and then differenced in pairs. The resultants, are passed through resistive matrices and summing and squaring circuits to produce separate outputs for each range increment.

4 Claims, 5 Drawing Figures

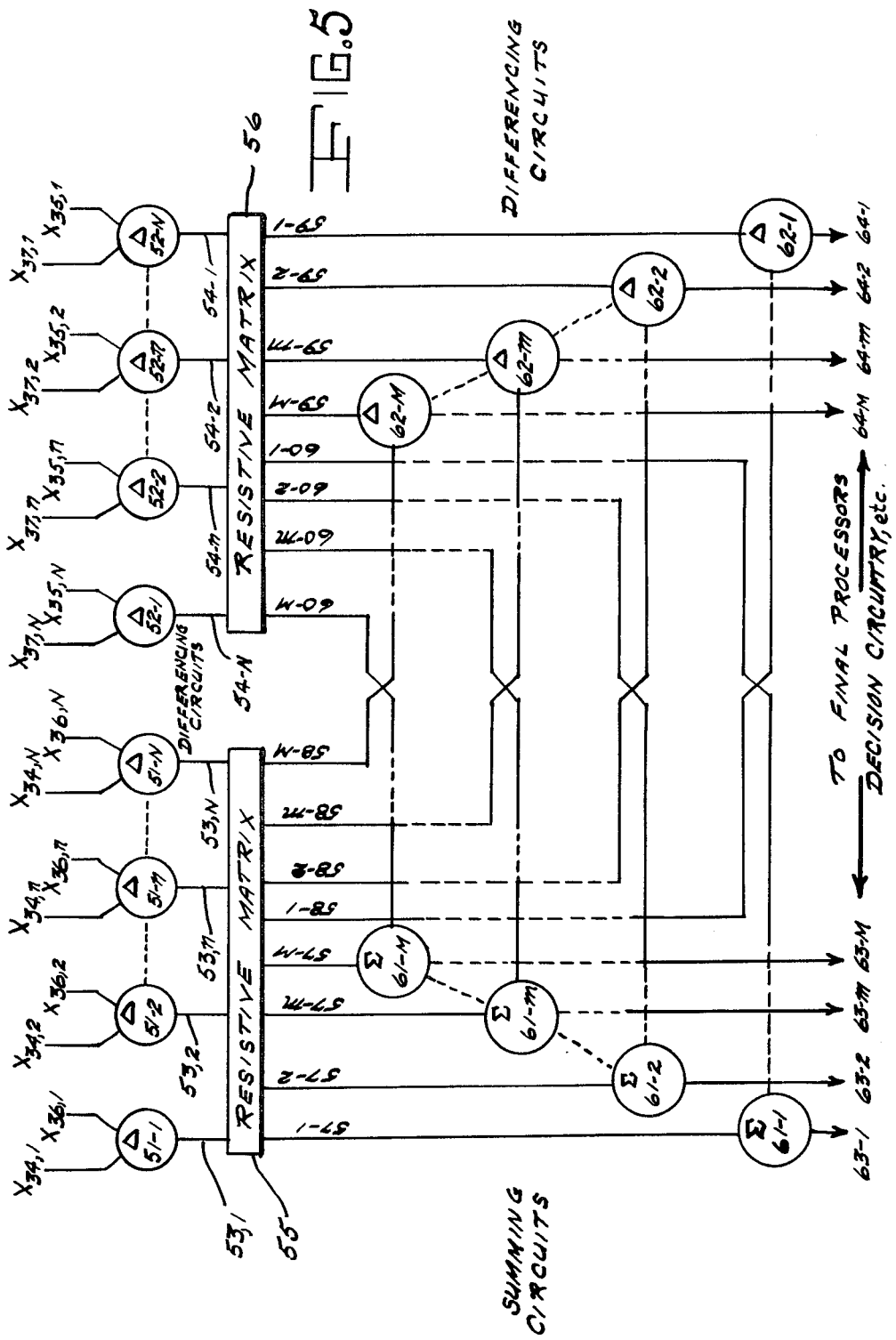

3,795,912

SPECTRUM ANALYSIS RADAR SYSTEM

BACKGROUND OF THE INVENTION

The invention relates to random signal radar systems, and in particular to spectrum analysis radars and to means for eliminating the ambiguities and other defects inherent in such systems.

The search for techniques that would improve certain operational and physical characteristics of conventional radars has generated a greater interest in random-signal radars. Areas of principal concern are operation in the presence of clutter or other interfering signals, greater use of the target phase information by processing both the amplitude and phase of the return signal, elimination of range and velocity ambiguities, and a reduction in size and complexity. Although the use of random (noise) signals can improve radar performance, extraction of the range and phase information from the reflected signal is not as direct as in conventional radars. Random-signal radars have traditionally required special processing techniques that are based on the radar-range ambiguity function. This is determined by comparing the received signal with a reference signal in a cross correlator, the reference signal being an arbitrarily delayed portion of the transmitted signal. The radar range is then taken as the delay that is necessary to make the reference signal match the received signal.

The cross correlator is a complex mechanism that in practice often takes the form of a special-purpose digital computer.

The spectrum-analysis radar needs no cross correlator or delayed reference signal. It processes an unmodulated random illuminating signal, yielding the same range information as a cross correlator. This technique comprehends a system in which a random signal is generated by a noise source and transmitted. A very small part of the transmitted signal is coupled off for the reference signal and applied to one side of the summing tee. The other input to the tee is the received signal. The power spectrum of the resulting sum signal is modulated.

The modulation comes about because as each component of the transmitted power spectrum propagates out to the target and back again, it is shifted in phase by an amount proportional to its frequency. By definition, the time-averaged amplitude and phase characteristics of any frequency component of a noise signal remain constant. Since the reference signal originated in the transmitted signal it is also a noise signal, and therefore a standard against which to compare the received signal.

The simple addition of the reference and received signals simultaneously yields a measurement of the phase shift undergone by every frequency component as it propagates out to the target and back. As the two superposed spectra go through cycles of constructive and destructive interference, a modulation, or fringe, pattern is set up in the sum spectrum. It is sifnificant that the frequency difference between nulls in the modulation pattern depends only on the range to the target; the modulation amplitude depends on the relative intensities of the target and reference signals; and the absolute location of the nulls depends on the total phase shift induced in the transmitted signal by both the range and deflection of the target.

A detailed description of the spectrum analysis radar is given in U.S. Pat. No. 3,568,189 entitled, *SPECTRUM ANALYSIS RADAR SYSTEM FOR ANGLE DETERMINATION*, issued to Joseph L. Poirier, March 2, 1971.

Spectrum analysis radar systems of the type described however, suffer from undesirable false target characteristics, high self noise, serious direct leakage problems, and inability to detect rapidly moving targets at large ranges. The processing employed in the present invention together with signal pulsing effectively removes these disadvantages. Suppression of false targets makes possible the use of shorter processing times at long ranges and thus makes practical the detection of long-range rapidly-moving targets. The inherent flexibility of the system disclosed herein allows capability of adapting to interference conditions that is superior to that of cross-correlation type noise radars or conventional pulsed radars.

SUMMARY OF THE INVENTION

The spectrum analysis radar system comprehended by this invention includes means for generating and transmitting limited bandwidth noise signals. It also has circuits for providing four replica reference signals for each transmitted signal. The reference signals are phase shifted 0°, 90°, 180°, and 270°. Means are provided for receiving echo signals from radar targets intercepted by the transmitter signals. Summing circuits sum each echo signal with each of its corresponding phase shifted reference signals. The summed signals are analyzed by a spectrum analyzer. The outputs of the spectrum analyzer are algebraically combined by processing circuits in a manner that provides target response indication in discrete range increments.

Novel features of the invention include the generation and utilization of four different signals formed by summing the received signal with four quadrative phase-shifted samples of the transmitted signal; proper algebraic processing of the four signals after power density spectrum analysis to achieve the equivalent of cross-correlation of the received signal and the reference signal; and, considerable flexibility in that the system can operate with a variety of different waveforms, can adapt to various interference conditions, and can be designed to have variable range resolution chsracteristics.

It is a principal object of the invention to provide a new and improved spectrum analysis radar.

It is another object of the invention to provide a spectrum analysis radar that eliminates the false target characteristics, high self noise and direct leakage problems inherent in state of the art spectrum analysis radar systems.

It is another object of the invention to provide a spectrum analysis radar that is capable of detecting rapidly moving targets at large ranges.

These, together with other objects, advantages and features of the invention, will become more apparent from the following detailed description when taken in conjunction with the illustrative embodiment in the accompanying drawings.

DESCRIPTION OF THE DRAWINGS

FIG. 5 is a block diagram illustrating the resistance matrices and input-output circuitry that follows the analysis banks shown in FIG. 2.

DETAILED DESCRIPTION OF THE PREFERRED EMBODIMENT

In the following description and theoretical analysis of the invention complex notation for radio frequency and intermediate frequency waveforms will be used. The real waveform corresponding to the signal $X(t)$ will be Real part of $X(t) e^{2\pi j f_0 t}$ where $f_0$ is a frequency at the middle of the band of frequencies of interest, and $j$ is the square root of minus one.

Figure 1:
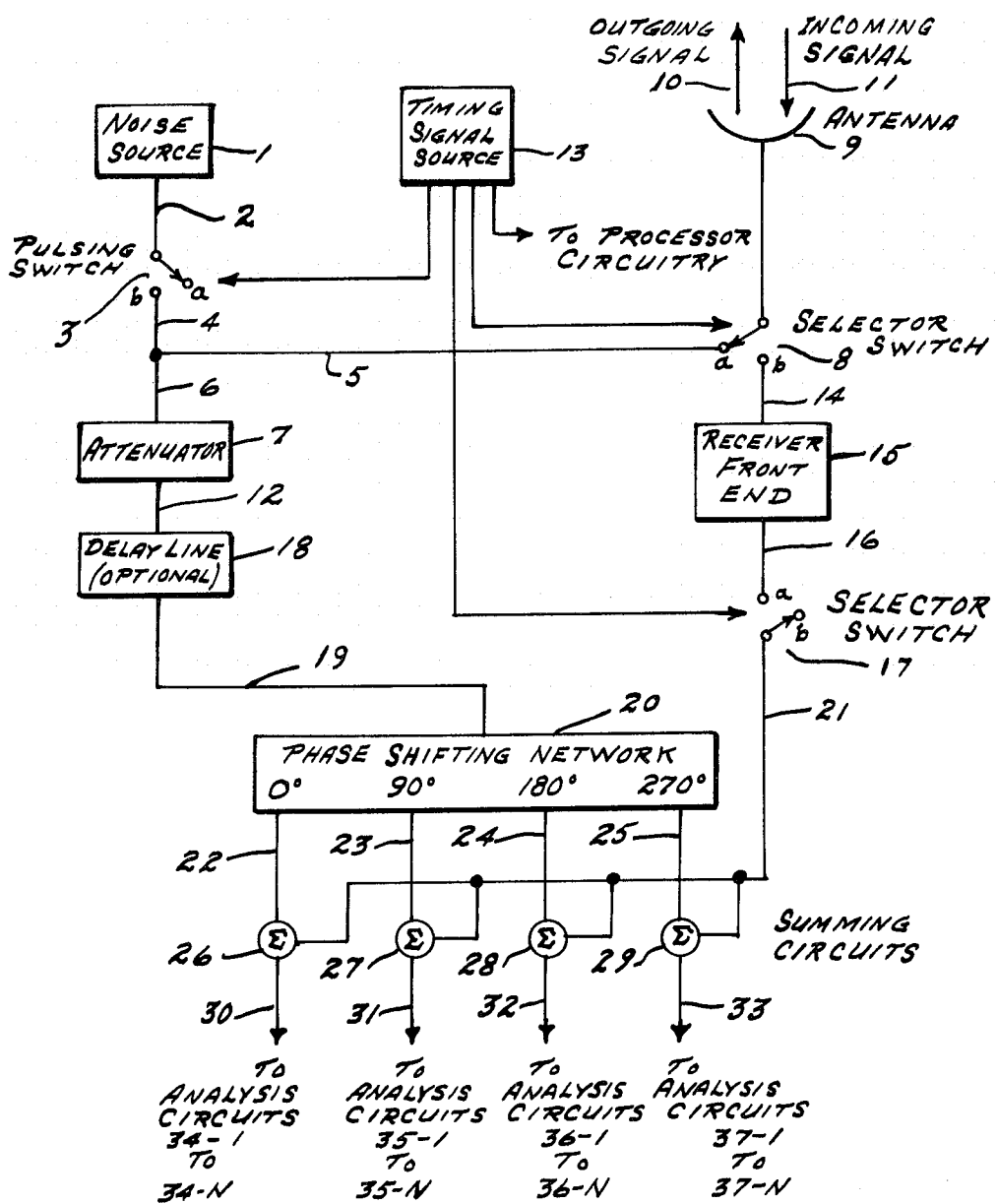
FIG. 1 is a block diagram illustrating the transmitter, receiver, phase-shift and summing circuits of the spectrum analysis radar comprehended by the invention.

Referring now to FIG. 1, the noise source produces a signal $X_2(t)$ on wire 2. The bandwidth of this noise source should be many times the reciprocal of the pulse length P. At time $t=0$ the pulsing switch 3 closes and remains closed until time P. The timing of all the switches is controlled by the timing signal source 13. At time P the pulsing switch opens and remains open until time C, which is the basic pulse repetition period, at which time the complete cycle of events starts over again.

The signal $X_4(t)$ on wire 4 is $$X_4(t) = \begin{Bmatrix} X_2(t), & 0 < t \leq P \\ 0, & P < t \leq C \end{Bmatrix}$$

The signal on wire 4 goes to both the attenuator 7 and selection switch 8 so that the signals on wires 4, 5, and 6 are all the same:

$$X_6(t) = X_5(t) = X_4(t).$$

The selection switch 8 connects the antenna 9 to the pulsed noise source while the pulse is occurring so that the outgoing signal $X_{10}$ is also given by $$X_{10}(t) = X_4(t).$$

From time P to time C the selection switch 8 connects the antenna to the first stages of receiver amplification 15. Thus if the incoming signal at the antenna is designated $X_{11}(t)$, the signal on wire 14 is given by $$X_{14}(t) = \begin{Bmatrix} 0, & 0 < t \leq P \\ X_{11}(t), & P < t \leq C \end{Bmatrix}.$$

This signal is amplified by the receiver circuitry 15, and is contaminated by receiver noise which is denoted by $Y(t)$. The resultant output on wire 16 is, except for an irrelevant amplification factor $$X_{16}(t) = X_{14}(t) + Y(t).$$

At some time $Q > P$ selection switch 17 connects the receiver output via wire 21 to the summing circuits and leaves it thus connected until a time $T + D$, so that $$X_{21}(t) = \begin{Bmatrix} 0, & 0 < t \leq Q \\ X_{16}(t), & Q < t \leq T + D \\ 0, & T + D < t \leq C \end{Bmatrix}.$$

Meanwhile the signal on wire 6 is passed through the attenuator 7. The output waveform from this attenuator is smaller in amplitude that at the input, but for the purposes of understanding the operation of this circuitry this amplitude attenuation can be ignored and it will be assumed for simplicity that the signal on wire 12 is $$X_{12}(t) = X_6(t).$$

This signal is then passed through the optional delay line 18 whose total delay is D so that the signal on wire 19 is $$X_{19}(t) = X_9(t-D).$$

The only restriction placed on D is that $$P + D < C.$$

The output from the delay line is passed into a network 20 which gives four outputs with phase shifts of 0°, 90°, 180°, and 270° from the input, and with gains carefully controlled so that the amplification or attenuation of the signal amplitude at 19 is the same to all four outputs. This circuitry can consist of a one-wavelength section of line with suitable taps if the network operates at typical radar frequencies, and, in any event, is state of the art. The four outputs of the phase-shifting network appearing on wires 22, 23, 24, 25 can be represented in complex notation as $$X_{22}(t) = X_{19}(t)$$
$$X_{23}(t) = jX_{19}(t)$$
$$X_{24}(t) = -X_{19}(t)$$
$$X_{25}(t) = -jX_{19}(t)$$

In the description above there has been omitted any conventional power or voltage amplifying or frequency-conversion circuitry which it might be convenient or necessary to use.

In particular, the circuitry described herein will work equally successfully if frequency conversion and power amplification is inserted at wire 5, and if approximately the same frequency conversion is incorporated in the receive circuitry 15. Furthermore, the basic operation of our circuitry is not altered by using separate antennas for transmitting and receiving connected to wires 5 and 14, respectively.

The outputs from the phase-shifting network are added to the output from selection switch 17 by means of the summing circuits 26, 27, 28, 29 to obtain signals on wires 30, 31, 32 and 33 given by $$X_{30}(t) = X_{22}(t) + X_{21}(t)$$
$$X_{31}(t) = X_{23}(t) + X_{21}(t)$$
$$X_{32}(t) = X_{24}(t) + X_{21}(t)$$
$$X_{33}(t) = X_{25}(t) + X_{21}(t).$$

These signals are then passed to analysis banks 34, 35, 36, and 37.

Figure 2:
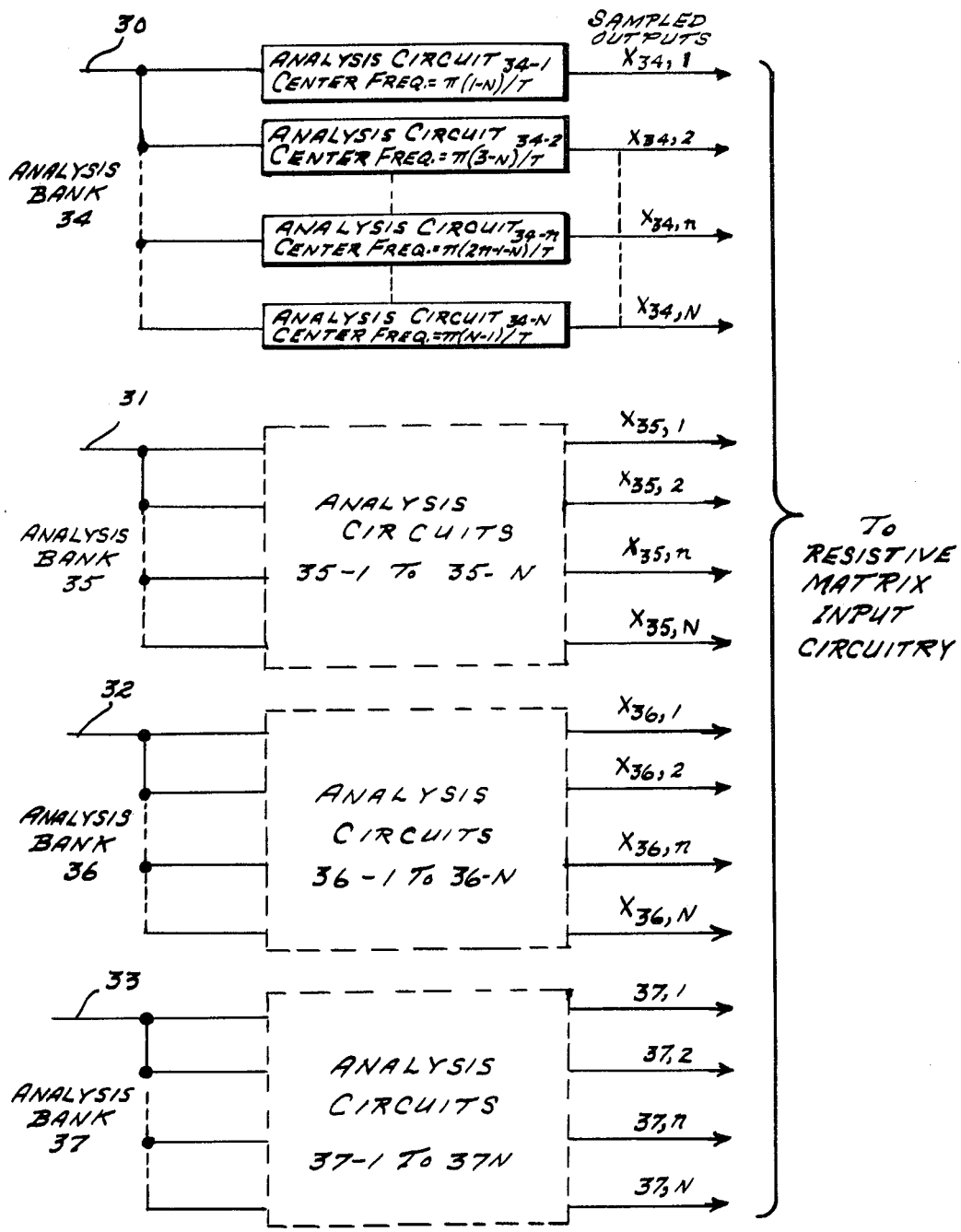
FIG. 2 is a block diagram of the analysis banks that follows the circuitry shown in FIG. 1.

FIG. 2 shows a block diagram of the analysis banks, with bank 34 laid out in some detail. Bank 34 as typical of the rest consists of N virtually identical sections that differ only in the nominal center frequency of the analysis filters. The outputs of the individual sections will be denoted by $X_{34,1}$, $X_{34,2}$ up through $X_{34,N}$. The number N is determined by the range accuracy requirements of the radar and may be chosen by the system designer for the particular radar application. Analysis banks 35, 36 and 37 are identical to 34.

Figure 3:
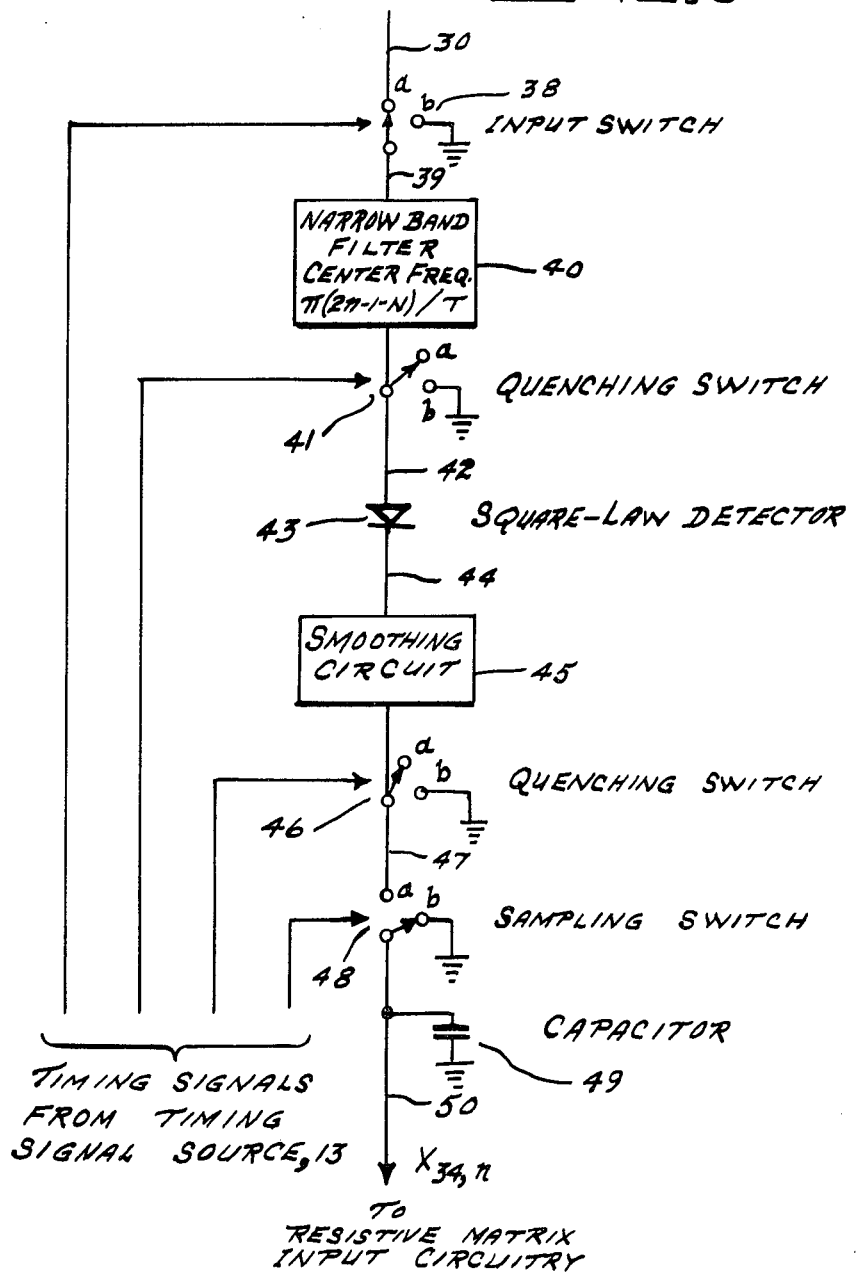
FIG. 3 is a block diagram illustrating a typical analysis circuit of the analysis banks of FIG. 2.

FIG. 3 shows in block diagram form analysis circuit 34-n, the nth of the N analysis circuits that comprise analysis bank 34. Before the time instant D, switches 38, 41, and 46 and 48 are all in the grounded or "b" positions so that all energy storage elements are discharged. At time instant D the quenching switches 41 and 46 open up to the "a" position, and the input switch connects the narrow band filter 40 to the input wire 30. Then at time T + D input switch 38 disconnects filter 40 from the input wire 30.

This narrow band filter has sufficiently high "Q" or low damping or narrow bandwidth that its output waveform at time T + D can be represented, in complex form, with sufficient accuracy as $$\overline{X_{42}(T+D)} = \int_D^{T+D} \exp(j2\pi n't/T) X_{30}(t) dt$$

where $n' = n - (N+1)/2$. The square law detector 43, in conjunction with the smoothing filter 45 that removes radio frequency or intermediate frequency ripple, produces an output at time T + D on wire 47 given by $$X_{47}(T+D) = |X_{42}(T+D)|^2.$$

At time (T + D) the sampling switch 48 transfers the voltage on wire 47 to the capacitor 49 and wire 50. The capacitor 49 holds this voltage on wire 50 for a short period of time of length H which is sufficient for subsequent processing operations to be accomplished. Wire 50 leads to resistive matrices input circuitry. At time T + D + H switches 41, 46 and 48 revert to the grounded position to discharge all energy and wait for the next pulse period.

Figure 4:
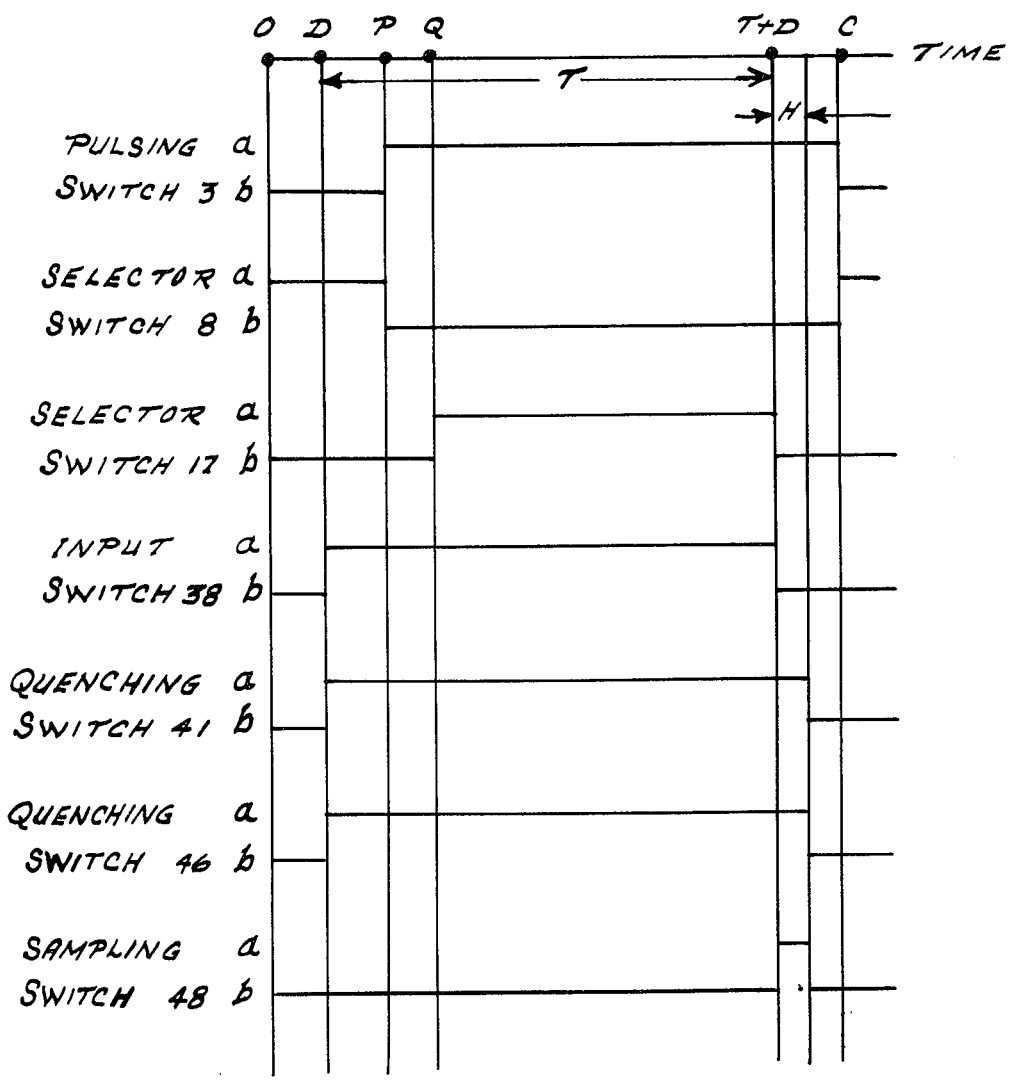
FIG. 4 is a timing sequence chart indicating the switching sequences of various switches in FIGS. 1 and 3.

FIG. 4 summarizes the timing sequence of the several switches.

Not only will the circuitry described operate successfully when embodied as shown in FIGS. 2 and 3 but the analog circuitry of the analysis banks may be replaced by digital circuitry which simulates it such as well-known "Fast-Fourier Transform" techniques, and with little degradation in performance "Fast Hadamard Transform" techniques can also be used.

FIG. 5 shows in block diagram form the operation of the resistive matrixes. At the inputs the differencing circuits 51-1 through 51-N form the differences of the voltages on corresponding wires from analyses banks 34 and 36 so that the voltage on a typical output wire 53-n is given by $$X_{53,n} = X_{34,n} - X_{36,n}.$$

In like manner difference circuits 52-1 through 52-N form the differences of corresponding voltages from analyses banks 35 and 37 to yield outputs $$X_{54,n} = X_{35,n} - X_{37,n}.$$

Wires 53-1 through 53-N go to resistive matrix 55 which produces 2M outputs 57-1 through 57-M and 58-1 through 58-M. The number M corresponds to the number of range delay cells the radar system designer desires. The outputs of the typical m'th wires will be $$X_{57,m} = \sum_{n=1}^{N} A_n \cos(2\pi n' S_m/T X_{53,n})$$

$$X_{58,m} = \sum_{n=1}^{N} A_n \sin(2\pi n' S_m/T) X_{53,n}$$

where, as earlier, $n' = n - (N+1)/2$. In like manner resistive matrix 56 produces typical outputs $$X_{59,m} = \sum_{n=1}^{N} A_n \cos(2\pi n' S_m/T) X_{54,n}$$

$$X_{60,m} = \sum_{n=1}^{N} A_n \sin(2\pi n' S_m/T) X_{54,n}.$$

In these expressions the number $S_m$ is the nominal range delay being examined by the m'th set of matrix outputs. It will be necessary to require that $S_m$ be smaller than $T - 7T/N$ and larger than $7T/N$ when the $A_n$'s are all equal and be somewhat further restricted for other choices of the $A_n$'s. The numbers $A_1$ through $A_N$ may be chosen by the designer for the best compromise between detectability in the presence of noise and discrimination between nearby targets. The term resistive matrix includes also the possibility that the matrixes may contain electronic amplifying and polarity reversal circuitry. Furthermore the nature of operation is essentially unaltered if the action of these matrixes is simulated by digital computation. The summing circuits 61-1 through 61-M then add the cosine-weighted components from matrix 56 to produce outputs of the form $$X_{63,m} = X_{57,m} + X_{60,m}.$$

In like manner the differencing circuits 62-1 through 62-M produce M outputs of which the typical one is $$X_{64,m} = X_{59,m} - X_{58,m}.$$

These final signal outputs then go to decision circuitry, visible displays, etc. For instance, the presence or absence of a target as delay $S_m$ can be measured by the size of the quantity $$(X_{63,m})^2 + (X_{64,m})^2$$

whereas the change of the ratio $$X_{64,m}/X_{63,m}$$

from one pulse period to the next gives a measure of the doppler velocity of a target at range $S_m$.

Operation of the above-described circuits can be theoretically analyzed in the following manner:

From the earlier expressions relating the several signal voltages, it holds that $$X_{47}(T+D) = |X_{42}(T+D)|^2$$
$$= X_{42}(T+D) X_{42}^*(T+D)$$

where the asterisk means complex conjugate. Thus $$\overline{X_{47}(T+D)} = \int_D^{T+D} dt \int_D^{T+D} du \exp[j2\pi n'(t-u)/T]$$
$$X_{30(t)} X_{30}^*(u)$$

with $n' = n - (N+1)/2$, and $$\overline{X_{34,n}} = \int_D^{T+D} dt \int_D^{T+D} du \exp[j2\pi n'(t-u/T]$$
$$X_{30}(t) X_{30}^*(u)$$

In like manner $$X_{35,n} = \int_D^{T+D} dt \int_D^{T+D} du \, \exp[j2\pi n'(t-u)/T]$$
$$X_{31}(t) X_{31}^*(u)$$

$$X_{36,n} = \int_D^{T+D} dt \int_D^{T+D} du \, \exp[j2\pi n'(t-u)/T]$$
$$X_{32}(t) X_{32}^*(u)$$

$$X_{37,n} = \int_D^{T+D} dt \int_D^{T+D} du \, \exp[j2\pi n'(t-u)/T]$$
$$X_{33}(t) X_{33}^*(u)$$

so that $$X_{53,n} = \int_D^{T+D} dt \int_D^{T+D} du \, \exp[j2\pi n'(t-u)/T]$$
$$[X_{30}(t) X_{30}(u) - X_{32}(t) X_{32}^*(u)]$$

$$X_{54,n} = \int_D^{T+D} dt \int_D^{T+D} du \, \exp[j2\pi n'(t-u)/T]$$
$$[X_{31}(t) X_{31}^*(u) - X_{33}(t) X_{33}^*(u)]$$

But since
$$X_{30}(t) = X_{21}(t) + X_{19}(t)$$
$$X_{31}(t) = X_{21}(t) + jX_{19}(t)$$
$$X_{32}(t) = X_{21}(t) - X_{19}(t)$$
$$X_{33}(t) = X_{21}(t) - jX_{19}(t)$$

It follows that
$$X_{30}(t) X_{30}^*(u) - X_{32}(t) X_{32}^*(u)$$
$$= 2X_{21}(t) X_{19}^*(u) + 2X_{19}(t) X_{21}^*(u)$$

and
$$X_{31}(t) X_{31}^*(u) - X_{33}(t) X_{33}^*(u)$$
$$= -2jX_{21}(t) X_{19}^*(u) + 2jX_{19}(t) X_{21}^*(u)$$

and thus that $$X_{53,n} = 2 \int_D^{T+D} dt \int_D^{T+D} du \, \exp[j2\pi n'(t-u)/T]$$
$$[X_{21}(t) X_{19}^*(u) + X_{19}(t) X_{21}^*(u)]$$

$$X_{54,n} = 2j \int_D^{T+D} dt \int_D^{T+D} du \, \exp[j2\pi n'(t-u)/T]$$
$$[-X_{21}(t) X_{19}^*(u) + X_{19}(t) X_{21}^*(u)]$$

It then follows that $$X_{57,m} = 2 \int_D^{T+D} dt \int_D^{T+D} du [X_{21}(t)X_{19}^*(u) + X_{19}(t)X_{21}^*(u)]$$

$$\sum_{n=1}^{N} A_n \cos(2\pi n' S_m/T) \exp[j2\pi n'(t-u)/T]$$

$$X_{58,m} = 2 \int_D^{T+D} dt \int_D^{T+D} du [X_{21}(t)X_{19}^*(u) + X_{19}(t)X_{21}^*(u)]$$

$$\sum_{n=1}^{N} A_n \sin(2\pi n' S_m/T) \exp[j2\pi n'(t-u)/T]$$

$$X_{59,m} = 2j \int_D^{T+D} dt \int_D^{T+D} du [-X_{21}(t)X_{19}^*(u) + X_{19}(t)X_{21}^*(u)]$$

$$\sum_{n=1}^{N} A_n \cos(2\pi n' S_m/T) \exp[j2\pi n'(t-u)/T]$$

$$X_{60,m} = 2j \int_D^{T+D} dt \int_D^{T+D} du [-X_{21}(t)X_{19}^*(u) + X_{19}(t)X_{21}^*(u)]$$

$$\sum_{n=1}^{N} A_n \sin(2\pi n' S_m/T) \exp[j2\pi n'(t-u)/T]$$

and thus that $$X_{63,m} = 2 \int_D^{T+D} dt \int_D^{T+D} du X_{19}(t)X_{21}^*(u) \sum_{n=1}^{N} A_n$$
$$\exp[j2\pi n'(t-u+s_m)/T]$$

$$+ 2 \int_D^{T+D} dt \int_D^{T+D} du X_{21}(t)X_{19}^*(u) \sum_{n=1}^{N} A_n$$
$$\exp[j2\pi n'(t-u-S_m)/T]$$

$$X_{64,m} = 2j \int_D^{T+D} dt \int_D^{T+D} du X_{19}(t)X_{21}^*(u) \sum_{n=1}^{N} A_n$$
$$\exp[j2\pi n'(t-u-S_m)/T]$$

$$- 2j \int_D^{T+D} dt \int_D^{T+D} du X_{21}(t)X_{19}^*(u) \sum_{n=1}^{N} A_n$$
$$\exp[j2\pi n'(t-u-S_m)/T]$$

To continue with the analysis, it is necessary to assume some particular set of values for $A_1$ through $A_N$. If the radar system designer wants to optimize the detection signal to noise ratio then these will be chosen to be equal. For convenience in explaining the operation it is assumed that $$A_1 = A_2 = A_3 = \ldots A_N = 1$$

although it should be stressed that this is not necessary for successful operation of this invention.

It can then be observed that $$\sum_{n=1}^{N} \exp (j2\pi n'Y/T) = \frac{\sin (N\pi Y/T)}{\sin (\pi Y/T)}$$

Now the function $\sin(N\pi Y/T)/\sin(\pi Y/T)$ has very large peaks at $Y = 0$, $Y = \pm T$, $Y = \pm 2T$, etc., and it is no larger than 5 percent of its peak magnitude when $Y$ differs from these peak locations by more than 7 $T/N$.

If the value $(t - u + S_m)$ is substituted for $Y$ in the expression above, it can be seen that the peaks occur when $t = u - S_m$, and when $t = u - S_m \pm T$, $u - S_m \pm 2T$, etc. But since it has been required that $$7T/N < S_m < T - 7T/N$$

and since the integration on $u$ involves only values of $u$ for which $$D \leq u \leq T + D$$

it is apparent that $u - S_m$ is bounded by $$D - T + 7T/N < u - S_m < T + D - 7T/N$$

Now the integration on $t$ involves only values of $t$ for which $D \leq t \leq D + T$ and hence the peaks $u - S_m \pm T$, at $u - S_m \pm 2T$, etc. do not fall within the range of integration on $t$. It is thus possible to write with excellent accuracy $$\int_D^{T+D} dt X_{19}(t) \sum_{n=1}^{N} \exp [j2\pi n'(t-u+S_m)/T]$$

$$\approx \int_{u-S_m-7T/N}^{u-S_m+7T/N} dt X_{19}(t) \sum_{n=1}^{N} \exp [j2\pi n'(t-u+S_m)/T]$$

$$= \int_{-7T/N}^{7T/N} dY X_{19}(Y+u-S_m) \frac{\sin (N\pi Y/T)}{\sin (\pi Y/T)}$$

In like manner one can approximate $$\int_D^{T+D} du X_{19}^*(u) \sum_{n=1}^{N} \exp [j2\pi n'(t-u-S_m)/T]$$

$$\approx \int_{t-S_m-7T/N}^{t-S_m+7T/N} du X_{19}^*(u) \sum_{n=1}^{N} \exp [j2\pi n'(t-u-S_m)/T]$$

$$= \int_{-7T/N}^{7T/N} dY X_{19}^*(Y+t-S_m) \frac{\sin (N\pi Y/T)}{\sin (\pi Y/T)}$$

When these expressions are substituted into the expressions for $X_{63,m}$ and $X_{64,m}$ it obtains that $$X_{63,m} \approx 2 \int_{-7T/N}^{7T/N} dY \frac{\sin (N\pi Y/T)}{\sin (\pi Y/T)} \cdot$$

$$\int_D^{T+D} du X_{19}(u+Y-S_m) X_{21}^*(u) \int_D^{T+D} dt X_{19}^*(t+Y-S_m) X_{21}(t)$$

$$= 4 \text{ Real} \left[ \int_{-7T/N}^{7T/N} dY \frac{\sin (N\pi Y/T)}{\sin (\pi Y/T)} \int_D^{T+D} dZ X_{19}(Z+Y-S_m) X_{21}^*(Z). \right]$$

Similarly $$X_{64,m} \approx -4 \text{ Imag} \left[ \int_{-7T/N}^{7T/N} dy \frac{\sin (N\pi Y/T)}{\sin (\pi Y/T)} \int_D^{T+D} dZ X_{19}(Z+Y-S_m) X_{21}^*(Z) \right].$$

Thus $X_{63,m}$ and $X_{64,m}$ represent approximately low pass filtered versions of the real and imaginary parts of the complex cross correlation function between $X_{19}$ and $X_{21}$, with the filtering corresponding to upper cut-off frequency of $N/2T$. Furthermore, if the radiated bandwidth and the receiver bandwidth are equal approximately to $N/T$ then the cross correlation function contains no higher frequency components than can be passed by the equivalent filter so that the device described herein can function almost exactly as a true correlation radar. In equation form:

$$X_{63,m} \approx 4T \text{ Real} \left[ \int_D^{T+D} dZ X_{19}(Z-S_m) X_{21}^*(Z) \right]$$

$$X_{64,m} \approx 4T \text{ Imag} \left[ \int_D^{T+D} dZ X_{19}(Z-S_m) X_{21}^*(Z) \right].$$

The subsequent processing can make use of these parameters to determine presence or absence of targets or target velocity, etc., for example, the quantity $$R_m = [(X_{63,m})^2 + (X_{64,m})^2]/ 16T^2$$

is equal to $$R_m = \left[ \int_D^{T+D} dZ X_{19}(Z-S_m) X_{21}^*(Z) \right]^2$$

Now if a target is present at radar delay $\tau$, with $$Q \leq \tau \leq T + D - P$$

then $$X_{11}(t) = \begin{cases} X_2(t-\tau), & \tau < t \leq \tau+P \\ 0, & \text{otherwise} \end{cases}$$

and thus $$X_{14}(t) = \begin{cases} X_2(t-\tau), & \tau < t \leq \tau+P \\ 0; & \text{otherwise} \end{cases}$$

and $$X_{16}(t) = \begin{cases} Y(t), & P < t \leq \tau \\ X_2(t-\tau)+Y(t), & \tau < t \leq \tau+P \\ Y(t), & \tau+P \leq t \leq C \end{cases}$$

or $$X_{21}(t) = \begin{cases} 0, & 0 < t \leq Q \\ Y(t), & Q < t \leq \tau \\ X_2(t-\tau)+Y(t), & \tau < t \leq \tau+P \\ Y(t), & \tau+P < t \leq T+D \\ 0, & T+D < t \leq C \end{cases}$$

But $$X_9(t) = \begin{cases} X_2(t), & 0 < t \leq P \\ 0, & < t \leq 0 \end{cases}$$

and thus $$X_{19}(t) = \begin{cases} 0, & 0tD \\ X_2(t-D), & DtD+P \\ 0, & D+PtC \end{cases}$$

and hence $$R_m = \left| \begin{matrix} P+D+S_m & \text{Min } (P+D+S_m, \tau+P) \\ dZX_2(Z-D-S_m)Y^*(Z) + dZX_2(Z-D-S_m)X_2^*(Z-\tau) \\ D+S_m & \text{Max } (\tau, D+S_m) \end{matrix} \right|^2$$

This expression has a pronounced peak only when $\tau - D = S_m$ thus establishing the range cell capability of this invention.

Various modifications, variations and extensions to the above described circuits are also comprehended by the invention. The following examples are illustrative of such modifications.

The phase splitter may be placed in the received signal path, or part of the phase splitting may be accomplished in the received signal path and part in the attenuated transmitted signal path. The necessary modifications of the combining circuitry at the output of the analysis circuits will be obvious from the mathematical equations in the section entitled, "Analysis of Operation."

The filters in the analysis branch may be replaced with frequency conversion mixers and low pass filters on the inphase and quadrature components of the mixed signal, or the input to the spectrum analyzers can be translated in frequency to a convenient low frequency where the narrow band filters are easier to construct, or, as discussed earlier, the action of the filters can be simulated by high speed digital computation.

Instead of using filters whose nominal frequencies are $(2n-N-1)/2T$ relative to the center of the band, filters with arbitrary frequencies $f_n$ may be used as long as the same values $f_n$ are used in the cosine and sine weighting matrixes. These frequencies may be chosen to be unequally spaced and in fact this will be desirable for certain applications.

The total bandwidth covered by the several analysis filters need not coincide with the transmitted bandwidth. When not all of the transmitted bandwidth is covered by the several filters, the circuitry described herein will act as a cross correlator for a transmitted waveform that has been restricted to the band covered by the filters.

Circuitry may be provided to change the spectrum of the transmitted pulse and the nominal frequencies of the analysis filters and of the cosine and sine weighting networks between one transmitted pulse period and the next transmitted pulse period in order to make jamming of the radar more difficult.

The circuitry may include frequency converters, voltage amplifiers and power amplifiers as convenient for construction purposes.

The weighting coefficients $A_n$ may be achieved by controlling the gain of the analysis filter circuits rather than by using the resistance matrix.

The receiver front end or amplifiers that precede the sum and difference circuits may include limiters or time gates to negate the effect of pulse jamming.

Disabling circuits may be included that disable all analysis filters of a particular frequency or several particular frequencies to negate the effects of a continuous wave or multiple tone jamming.

The coefficients $A_n$ may be chosen using techniques well-known in antenna array synthesis to minimize the "spill over" of targets at one range delay into a different range cell in the analysis, or to minimize the "spill over" of large close targets into the analysis cell for distant targets.

Since the circuitry described herein acts as an approximate cross correlator independent of the signal source it is possible, and can be desirable, to substitute other waveform sources such as pulse generators, swept frequency modulation generators, noise amplitude modulated sources, or shift register sequence sources for the noise source shown in FIG. 1. The nature of the source may be varied at convenient intervals to make jamming or spoofing more difficult.

The use of separate isolated antennas for receiving and transmitting is a possible variation.

If two antennas are used and if sufficient isolation between them is achieved the receiving path may be left connected while the transmitted pulse is being radiated. In this case the gating analysis filters may be replaced by ungated filters.

If the spacing between most adjacent analysis filters is reduced to one-half T hertz or less, then the 90° and 270° components from the phase splitter may be omitted, as well as the bank of analysis filters that use these outputs. The resulting final output will suffer a modest degradation due to the presence of a reversed cross-correlation function. In many applications this will not be serious as long as the additional constraint is placed in the range measurement parameters $S_m$ that $S_m \geq D + 7/T$ to prevent images of near targets at range delay $\tau$ from appearing as targets at range delay $2D-\tau$.

For slowly moving targets the frequency analysis can be accomplished in stages with part of the analysis being done during each pulse period, thus reducing the required number of filters for a given resolution accuracy.

Moving targets can be detected by suing local oscillator frequencies in the received signal channel that are offset from the local oscillator frequency in the reference signal channel. At a midband noise frequency $f_o$ a local oscillator frequency offset of $\Delta f$ in the received signal channel will cause a target with a radial velocity $v = (-\Delta f/2f_o)c$, $c =$ velocity of light, to appear essentially stationary.

The system can also be modified to operate in a CW mode rather than in a pulsed mode by using separate, isolated transmitting and receiving antennas. In this embodiment the active gates and filters in the pulsed system would be replaced with passive components.

Continuous, swept frequency spectrum analysis processing requiring only four filters, one for each of the four different sum signals, can be used instead of discrete spectrum analysis processing. In the continuous system the processing is done sequentially and consequently the data rate is much slower than in the parallel discrete system. Hence, only relatively low velocity targets can be satisfactorily detected.

While it has been shown and described what is considered at present to be a preferred embodiment of the invention, modifications thereto will readily occur to those skilled in the art. For example, also within the purview and the scope of the invention are any embodiments of this device that incorporates any combination or choice of the following features:

a. with matrix weighting factors that are proportional to sines and cosines, or with these weightings modified by multiplying all the weights associated with a given analysis frequency by a common factor with the same or different factor for different frequencies, or with the factors varied as a function of time to respond to varying interference conditions;

b. with the weighting matrix realized as a resistive matrix or simulated by digital computation or by combinations thereof;

c. with the filter banks being implemented at any convenient intermediate frequency, or by using in-phase and quadrature conversion at very low frequencies;

d. spectrum analysis by gated filters, or by passive filters, or by computational simulation of filters, or by filters with time varying center frequency, or by in-phase and quadrature channel low-pass filters;

e. with or without all consecutive analysis frequencies represented by sets of filters;

f. with the analysis accomplished either in parallel by banks of filters or serially by sweeping the center frequencies of a set of filters or by a composite of these methods;

g. with the use by the transmitter of pulsed signals or continuous signals, or pulse trains or swept frequency modulation, or any other waveform that is inherently capable of providing radar range information;

h. with the use of time varying light signals and one-fourth wavelength and one-half wavelength optical phase shifters and optical filters and photodetectors for optical detection and ranging.

i. with the use of time varying sound waves, and appropriate acousto-electric transducers, filters, phase shifters, etc., for acoustical detection and ranging;

j. with or without the use of auxiliary delay circuitry for the reference signal which delay may be time varying;

k. with or without the use of limiter or peak limiters or automatic gain-controlled circuitry preceding spectrum analysis or preceding addition of the reference signal;

k. with the quadrature phase shifting accomplished either in the signal path or the reference path or partly in each;

m. with or without local oscillator frequency offset in the signal path alone as a moving target detection aid;

n. with separate antennas or a common antenna with a T-R switch for transmitting and receiving;

o. with or without the circuitry modified by deletion of half of the analysis filters and phase shifting circuitry corresponding to a pair of opposite phased signal or reference voltages recognizing that a degradation of performance will accompany such deletion.

It is not therefore desired that the invention be limited to the specific arrangement shown and described and it is intended to cover in the appended claims all such modifications that fall within the true spirit and scope of the invention.

What is claimed is:

1. A spectrum analysis radar system comprising
a source of limited bandwidth noise signals,
radar transmitting and receiving apparatus for transmitting said noise signals and receiving echo signals from radar targets intercepted thereby,
a reference signal circuit connected to said source of noise signals adapted to provide a plurality of phase shifted replica reference signals for each transmitted noise signal,
a first summing circuit adapted to sum each received echo signal with each of its corresponding phase shifted replica reference signals,
a spectrum analyzer having multiple outputs adapted to provide a power density spectrum analysis of each summed signal, and
a processing circuit adapted to effect algebraic combinations of appropriate spectrum analyzer outputs in a manner that provides target response indication in discrete range increments.

2. A spectrum analysis radar system as defined in claim 1 wherein said reference signal circuit provides an in-phase and a 180° phase shifted replica reference signal for each transmitted noise signal.

3. A spectrum analysis radar system as defined in claim 1 wherein said reference signal circuit provides 0°, 90°, 180° and 270° phase shifted replica reference signals for each transmitted noise signal.

4. A spectrum analysis radar system as defined in claim 3 wherein said spectrum analyzer comprises a first analysis bank of multiple, parallel, narrow band filter circuits adapted to analyze the sum of echo and 0° phase shifted reference signals, a second analysis bank of multiple, parallel, narrow band filter circuits adapted to analyze the sum of echo and 90° phase shifted reference signals, a third analysis bank of multiple, parallel, narrow band filter circuits adapted to analyze the sum of echo and 180° phase shifted reference signals, and a fourth analysis bank of multiple, parallel, narrow band filter circuits adapted to analyze the sum of echo and 270° phase shifted reference signals.

* * * * *